United States Patent Office 3,256,366
Patented June 14, 1966

3,256,366
PROCESS FOR THE PREPARATION AND VUL-
CANIZATION OF A MIXTURE OF AN OLEFIN
POLYMER WITH AN OLEFIN COPOLYMER
Luigi Corbelli, Ferrara, Italy, assignor to Montecatini,
Societa Generale per l'Industria Mineraria e Chimica,
Milan, Italy, a corporation of Italy
No Drawing. Filed Oct. 3, 1960, Ser. No. 59,792
Claims priority, application Italy, Oct. 6, 1959,
16,611/59
14 Claims. (Cl. 260—897)

The present invention relates to the preparation and vulcanization of articles made from a mixture of one or more low or high density olefin polymers, more particularly polyethylene, in the presence or absence of an isotactic olefin polymer, and of an olefin copolymer, more particularly either a copolymer of ethylene with an alpha-olefin or a copolymer of one alpha-olefin with another alpha-olefin.

It is well known that polyethylene, in spite of its many varied uses, cannot be employed in the production of manufactured articles which must be used, even if only intermittently, at temperatures of about 100° C. or higher. Thus, at about these temperatures, e.g. at between about 105° C. and 125° C. the various polyethylenes first become softened and then melt, thereby completely losing the usual mechanical properties which render their use possible at lower temperatures.

For instance, in the field of electric applications and more precisely if polyethylene is used for the construction of insulating sheaths for cables, its inherent thermoplasticity is a serious inconvenience because in the event of a short-circuit of sufficient duration or in the event of overloads wherein temperatures of 150° C. and above may exist in the conductor, the entire cable may become useless due to the considerable softening or complete melting of the polyethylene insulating sheath whereby the conductor becomes directly exposed, without any overlying insulation. In general, heavy power cables function at working temperatures of about 80–90° C., i.e., rather near the softening point of polyethylene.

As is known, the inconvenience resulting from the softening of polyethylene at high temperatures can be avoided by first cross-linking the polyethylene. In order to obtain sufficient cross-linking, either physical methods (high energy beta or gamma radiation) or chemical methods (e.g., organic peroxides) can be used.

In the first instance, it is necessary that the manufactured article to be irradiated have previously been shaped. Further, the radiation source must either be a nuclear reactor or a Van de Graaff accelerator, both of which are very expensive equipment.

The second method, chemical cross-linking, provides for a mechanical mixing of the polymer with a vulcanizing agent before shaping the manufactured articles. Such a system suffers from the following inconveniences: (1) the mixing of the vulcanizing agent (generally an organic peroxide) must be carried out at a temperature lower than 100–110° C., for at such higher temperatures the decomposition rate of the most frequently used peroxides becomes too high and a pre-vulcanization phenomenon may occur; (2) at such lower temperatures, however, low-density polyethylene is only partially melted and high density polyethylene is only in the softening stage, so that the vulcanizing agent cannot be well dispersed in the thus prepared mixture, and, accordingly, vulcanized products having an inconsistent and erratic degree of cross-linking are obtained; (3) even when the mix is prepared at the aforementioned lower temperatures, there is always the possibility that in certain portions of the mixture, due to mechanical friction, considerably higher temperatures are reached, thereby virtually ensuing undesired prevulcanization.

Additional inconveniences occur when the polyethylene-vulcanizing agent mixtures are employed in order to obtain extruded or injection-molded manufactured articles. These operations require high temperatures and in some cases are possible only if carried out at temperatures of from 160 to 200° C. However, at these temperatures the mixture is certainly cross-linked during the working stage, with the inevitable result that the operating machines are blocked and impeded. On the other hand, if attempts are made to operate at lower temperatures (e.g. 100°–130° C.), manufactured articles of imperfect shape are invariably obtained. Attempts have been made to eliminate these inconveniences by the addition of "diluents" to the mixture to thereby make it possible to work the polyethylene-vulcanizing agent mixture at a sufficiently low temperature, so as not to cause the aforementioned pre-vulcanization phenomena. Such attempts have included mixing polyethylene with natural rubber, carbon black, or other fillers normally used in the rubber industry.

However, when polyethylene is mixed with the aforementioned materials, more particularly with unsaturated rubbers, it loses all of its characteristically good resistance to ageing, so that this system has not been successful. Good results have been obtained using the mixtures of polyethylene with carbon black for the construction of pipes and certain electric cables. However, as regards the latter electrical applications, such mixtures have such poor electric properties that their only field of use is in low-tension and low-power cables.

It is an object of the present invention to eliminate the aforementioned inconveniences and to obtain articles made of mixtures containing polyethylene by extrusion, injection moulding, blowing, etc., at a temperature lower than the temperature that would be required for polyethylene alone and also lower than the decomposition temperature of the vulcanizing agent. The shaped articles according to the present invention can then be vulcanized at the optimum temperature for the particular vulcanizing agent or agents.

We have found that polyethylene can be readily and homogeneously mixed at a temperature higher than its softening point with one or more copolymers of either ethylene with an alpha-olefin or of one alpha-olefin with another alpha-olefin, and that the mixture thus obtained is of sufficient plasticity to permit the incorporation of a vulcanizing agent, provided that the temperature of the mixture is maintained below the decomposition so as to incorporate said temperature of the vulcanizing agent, i.e. at a temperature of from about 60 to 90° C. Under such conditions there is virtually no possibility that the vulcanizing agent will decompose and cause pre-vulcanization phenomena. The polyethylene-copolymer mixes incorporating vulcanizing agent therein have such characteristics that they can be shaped at definitely lower temperatures than those required for working polyethylene alone and also lower than the temperature at which pre-vulcanization phenomena might take place. Accordingly, the previous necessity of working the mixture at excessively high temperatures is obviated. Of even greater significance, as a result of our invention the vulcanization of the shaped articles can be carried out at the optimum temperature conditions for the particular type of agent used.

According to the present invention, the mixing of polyethylene with the olefin copolymer is preferably carried out at a temperature higher than the softening point of polyethylene (125° C.), whether low-density or high-density polyethylene, whereby a very good dispersion of the copolymer in the semimelted mass of the polyethylene is obtained. According to a preferred embodiment of the invention, the temperature should not exceed from about 150-170° C., although the copolymer, due to its saturated nature, can resist even higher temperatures. The homogeneous polyethylene-copolymer mixtures obtained by mixing (e.g. in a Banbury mixer) at a temperature of from about 125° to 170° C., present such rheological characteristics as to be sufficiently plastic at a temperature lower than the decomposition temperatures of the most widely used peroxides, i.e. at a temperature from about 60 to 90° C. Thus, the addition of such peroxide vulcanizing agents can be easily carried out at such a temperature (between 60° and 90° C.), e.g. in a common roll mixer.

We have found that polyethylene-copolymer mixtures containing vulcanizing agents which have been added as described above, offer a great advantage in that such a mixture can be shaped by any number of methods, e.g. extrusion, injection-moulding, die-casting, blowing, etc. this shaping being carried out at a low temperature whereby no pre-vulcanization phenomena occur. More particularly, such mixtures are desirably shaped at a temperature lower than 125° C. Articles thus formed or semifinished articles may then be vulcanized under the optimum conditions for the particular peroxides used. More particularly, the vulcanization should be carried out at a temperature from about 150° C. to 180° C. using the same techniques and equipment as are ordinarily used in vulcanizing articles and manufactured products made of conventional rubbers.

The copolymers most suitable for the mixtures are either copolymers of ethylene with an alpha-olefin or are copolymers of one alpha-olefin with another alpha-olefin, more particularly, copolymers of ethylene with propylene and/or butene or copolymers of propylene with butene. Ethylene-propylene and ethylene-butene copolymers of virtually any proportions can be used, but best results are obtained with copolymers containing from 40 to 60 mole percent ethylene for ethylene-propylene copolymers and from 50 to 70 mole percent ethylene for ethylene-butene copolymers.

The molecular weight of the copolymers used varied from 50,000 to 500,000, and the results were always satisfactory. However, best results are obtained using copolymers having molecular weights from about 80,000 to 200,000. The proportions of polyethylene and copolymer in that the polyethylene-copolymer mixture are not critical, but it is preferable that the copolymer not exceed 60-70% nor be less than 10% by weight per 100 parts of the mixture. Of course, the particular proportions to employed for a specific use depends on the type and molecular weight of the particular polyethylene used and also upon the final mechanical characteristics desired for the end product. According to a further feature of the invention, an isotactic saturated polymer may be added in an amount up to 30% by weight of the mixture. More particularly, the addition of isotactic polypropylene and/or polybutene improves the mechanical characteristics of the shaped articles.

Various types of organic peroxides may be used as the vulcanizing agent, including cumyl peroxide, tetrachloro di-tertiary butyl peroxide, tertiary butyl cumyl peroxide, and the like. In general, any organic peroxide is suitable provided that at 110-125° C. it exhibits a low rate of decomposition. At the time of addition of the peroxide to the mix the antioxidant and sulfur are also added. Sulfur, which is preferably added in equimolar amounts to the peroxide according to a process described in patent application No. 40,687, now abandoned, is very important in the vulcanization of saturated olefin copolymers. After three additions the mix is reduced to the most suitable shape (e.g. small cubes or tapes), and is then ready for the desired use. The various experimental mixtures thus obtained may be used to produce manufactured articles of various types; i.e., extruded, injection-moulded, or compression-moulded articles. These operations are easily carried out at temperatures of from about 110° to 125° C. Vulcanization of the articles thus shaped is then carried out in an autoclave (ie. continuous vulcanization reactors for electric cables) at a temperature from 150° to 180° C. for a time from a few minutes (5) up to an hour, depending on the particular peroxide used. In order to control the co-vulcanization of polyethylene with the olefin copolymers, the end products are subjected to extractions with xylene at 140° C. for 4 hours in order to determine the soluble fraction. A "guttering" test in an oven at 150° C. for 24 hours is also carried out for some manufactured articles.

To summarize, the use of olefin copolymers as "diluents" of polyethylene according to the present invention offers the following remarkable advantages:

(a) These copolymers can be admixed with ethylene in any proportion;

(b) Owing to their saturated nature, these copolymers can be mixed with polyethylene in a Banbury type mixer at any temperature (above the softening point of polyethylene) without danger of excessive degradation;

(c) The polyethylene-copolymer mixtures can be worked in a roll mixer without any difficulty at temperatures lower than 90° C. and this permits easy addition of the vulcanizing agent;

(d) The electrical properties of the olefin copolymers are very good, i.e. of the same order as the electrical properties of polyethylene. Therefore, the properties of the polyethylene are not degraded when it is in admixture with the copolymer;

(e) The good permeability of olefin copolymers to gases makes it possible when such copolymers are added to polyethylene, to obtain extruded or moulded articles free of blisters and blowholes (this is very important in the field of high-voltage electric cables);

(f) The olefin copolymers are completely vulcanizable with peroxides and when such copolymers are in admixture with polyethylene in the presence of peroxides, they co-vulcanize with the polyethylene;

(g) The addition of olefin copolymers which are essentially amorphous improves remarkably the resistance of polyethylene to the phenomenon known as "environmental stress cracking" (i.e. cracking in the presence of particular substances, generally of a polar nature);

(h) Due to the saturated character of the copolymers the very good resistance of polyethylene to ageing is not impaired.

The following examples will further illustrate our invention. All parts are by weight unless otherwise stated.

*Example 1*

A unipolar electric cable about 500 meters long, having a conductor cross-section of 12.5 square millimeters and an insulating sheath thickness of 5 mm. was prepared. High pressure polyethylene, grade 4, and an ethylene-butene copolymer (containing 60 mole percent ethylene) having a molecular weight of 160,000 were used for the insulating sheath. The composition of the mixture was as follows:

To a mixture of 60 parts of polyethylene and 40 parts of an ethylene-butene copolymer, which was prepared in a Banbury mixer at 140° C. was added 2 parts of cumyl peroxide, 0.25 part of sulfur and 0.05 part of an antioxidant, i.e. "2246" (bis[2-hydroxy-3-tertiary-butyl-5-methylphenyl]methane) in a roll mixer at 60° C. The cable was extruded at 115° C. at a speed of about 2 meters per minute and was continuously vulcanized at 165° C. After vulcanization the insulating sheath was tested at 20° C. to determine its dielectric strength and its electric resistance according to ASTM specification D470–58T, thereby obtaining the following results:

Highest voltage tolerated at 50 Hz. _____volts__ 60,000
Highest electric field tolerated at 50 Hz. _____volts/mm__ 24,000
Electric resistance _____megohms/km__ 30,000
Electric resistivity _____ohms/cm__ $1.5 \times 10^{16}$ The same sheath material was also subjected to tests to determine the dielectric constant and the tangent of the loss angle, leading to the following results:

Dielectric constant at 20° C. (50 Hz.)_____ 2.3
Tangent of the loss angle at 20° C. (50 Hz.) ____ 0.002

After conditioning the samples for 14 days in distilled water at 50° C., the same determinations gave the following results:

Dielectric constant at 20° C. (50 Hz.)_____ 2.4
Tangent of the loss angle at 20° C. (50 Hz.)____ 0.003

The insulating sheath (unthreaded from the conductor) was subjected to mechanical tests according to ASTM specifications D412–51T, leading to the following results:

Tensile strength _____kg./cm.$^2$__ 103
Elongation at break _____percent__ 450

A sheath piece about 10 cm. long was extracted with xylene at 140° C. for 4 hours. After vacuum drying in an oven at 60° C. the weight loss was 12%.

A cable piece about 1 meter long (wound up on a metal cylinder having a diameter of 10 cm.) was placed in an air oven at 150° C. for about 24 hours. At the end of the trial the insulating sheath was found to be in very good condition with no sign of "guttering" or of displacement of the conductor. The same result was also obtained with another sample subjected to a similar test at 200° C. rather than 150° C. for 4 hours.

*Example 2*

A cable similar to that of Example 1 was prepared using a polyethylene-ethylene butene copolymer mixture similar to that of Example 1, however 10 parts of isotactic polypropylene powder having a molecular weight of 20,000 were added during the working of the mixture in a Banbury mixer. This addition was made in order to enhance the mechanical properties of the end product. The other ingredients, i.e., peroxide, sulfur and antioxidant, were introduced in the same amounts as in Example 1. The cable was extruded at 125° C. with a speed a little lower than used in Example 1 without any particular difficulty. Determination of electric properties produced practically the same results as obtained in Example 1. The following mechanical characteristics were determined:

Tensile strength _____kg./cm.$^2$__ 115
Elongation at break _____percent__ 400

Good results were also obtained using isotactic polybutene in amounts of the order of from 10 to 20 parts as a reinforcing agent. Polybutene offers an advantage in that it can be co-vulcanized with polyethylene as well as with ethylene-butene copolymer.

*Example 3*

A unipolar electric cable having a length of about 200 meters, a conductor cross-section of 12.5 mm.$^2$, and an insulating sheath thickness of 8 mm. was prepared. Low pressure polyethylene of approximately grade 1 and an ethylene-propylene copolymer (containing 52 mole percent ethylene) having a molecular weight of 140,000 were used for the insulating sheath. The mixture consisted of 50 parts polyethylene and 50 parts ethylene-propylene copolymer. The mixture was prepared in a Banbury mixer at 150° C. In the roll mixer 1.6 part tertiary-butyl-cumyl peroxide, 0.25 part sulfur, and 0.5 part Antioxidant "2246" were added to the mix while working at 70° C. The cable was extruded at 125° C. at a speed of about 2 meters per minute and was continuously vulcanized at a temperature of 170° C. After vulcanization the electric properties of the insulating sheath (ASTM D470–58T) were determined giving the following results:

Highest voltage tolerated at 50 Hz. ____volts__ 80,000
Highest electric field tolerated at 50 Hz. _____volts/mm__ 25,000
Electric resistance _____megohms/km__ 51,000
Electric resistivity _____ohms/cm__ $2 \times 10^{16}$ A sample of the above material was subjected to determination of its dielectric constant and of the tangent of the loss angle, giving the following results:

Dielectric constant at 20° C. (50 Hz.) _____ 2.4
Tangent of the loss angle at 20° C. (50 Hz.) ____ 0.0015

After a conditioning period of 14 days in distilled water at 40° C. the same sample gave the following values:

Dielectric constant at 20° C. (50 Hz.) _____ 2.4
Tangent of the loss angle at 20° C. (50 Hz.) _____ 0.002

The insulating sheath, suitably separated from the conductor, was subjected to mechanical tests according to ASTM Specification D412–51T, giving the following results:

Tensile strength _____kg./cm.$^2$__ 110
Elongation at break _____percent__ 380

A sheath piece about 10 cm. long was subjected to extraction with xylene at 140° C. for 4 hours. After vacuum drying in an oven at 60° C. a weight decrease of 11% was determined. Guttering tests at 150° C. and 200° C., these tests similar to those described in Example 1, gave very good results.

*Example 4*

A mixture was prepared in a Banbury mixer at 140° C. This mixture was made up of 75 parts high pressure polyethylene (grade 4) and 25 parts of ethylene-propylene copolymer (containing 45 mole percent ethylene) having molecular weight of 120,000. 3 parts tetrachloro-tertiary-butyl peroxide, 0.37 part sulfur, and 0.5 part Antioxidant "2246" were added to this mixture in a roll mixer. Pipes and shaped articles of various shapes and sizes were produced from this material by extrusion at 120° C. After extrusion the manufactured articles were placed in an autoclave at 165° C. for 30 minutes to carry out the vulcanization. Specimens were prepared from some samples for mechanical tests carried out according to ASTM Specification D412–51T. The following results were obtained:

Tensile strength _____kg./cm.$^2$__ 108
Elongation at break _____percent__ 430

Portions of the samples were subjected to extraction with xylene at 140° C. for 4 hours. A weight decrease generally not higher than 12% was found. From the above mixture various articles and containers of many types were obtained by injection molding at 120° C. in an ordinary press. Vulcanization of these manufactured articles was carried out in an autoclave at 155° C. for 1 hour. Some of these vulcanized articles were placed in an oven at 150° C. for 24 hours. All of them maintained their shape and a good consistency. The test was also carried out at 200° C. for 4 hours with similar results.

Variations can of course be made without departing from the spirit of my invention.

Having thus described my invention, what it is desired to secure and claim by Letters Patent is:

1. A method for preparing and vulcanizing a polymeric mixture, which comprises;
   (1) homogeneously mixing polyethylene with a saturated amorphous copolymer selected from the group consisting of copolymers of ethylene with a lower alpha-olefin having 3 to 4 carbon atoms, and copolymers of said lower alpha-olefin with each other, at a temperature above the softening point of the polyethylene above about 125° C. and thereby obtaining a mixture of a lower softening point;

(2) adding an organic peroxide to the soft mixture, this addition being at a temperature lower than the decomposition temperature of said organic peroxide in the range of from about 60° C. to about 90° C.;

(3) shaping the mixture to a desired conformation; and (4) heating the resulting shaped article at vulcanization temperatures from about 150° C. to about 180° C.

2. The method of claim 1 wherein an isotactic saturated lower alpha-olefin polymer is incorporated into the mixture prior to the addition of the organic peroxide.

3. The method of claim 1 wherein the polyethylene is a high density polyethylene.

4. The method of claim 1 wherein the polyethylene is a low density polyethylene.

5. The method of claim 1 wherein to the polyethylene an ethylene-propylene copolymer mixture is added in proportions of 10 to 70 parts by weight per 100 parts of the mixture.

6. The method of claim 1 wherein to the polyethylene an ethylene-butene copolymer mixture is added in proportions of 10 to 70 parts by weight per 100 parts of the mixture.

7. The method of claim 1 wherein isotactic polypropylene is added to the polyethylene-copolymer mixture in proporions of from 5 to 30 parts by weight per 100 parts of the mixture.

8. The method of claim 1 wherein isotactic polybutene is added to the polyethylene-copolymer mixture in proportions of from 5 to 30 parts by weight per 100 parts of the mixture.

9. The method of claim 1 wherein the mixture is prepared at a temperature of from 125 to 160° C.

10. The method of claim 1 wherein as vulcanizing agent an organic peroxide in an amount of from 0.1 to 5% by weight of the mixture is used together with sulfur, preferably in equimolar amount with the peroxide.

11. The method of claim 1 wherein the mixture of the vulcanizing agent is shaped at a temperature from about 110° to 125° C. whereby no decomposition of the peroxide occurs.

12. A vulcanizable mixture comprising polyethylene and a substantially amorphous copolymer selected from the group consisting of copolymers of ethylene with lower alpha-olefins having 3 to 4 carbon atoms and copolymers of said lower alphaolefins with each other; said vulcanizable mixture containing an effective amount of an organic-peroxide vulcanizing agent.

13. The mixture of claim 12 which contains an isotactic saturated polymer.

14. An electric cable, the sheath of which is made from the vulcanizable mixture of claim 12.

References Cited by the Examiner

UNITED STATES PATENTS

| | | | |
|---|---|---|---|
| 2,824,089 | 2/1958 | Peters | 260—897 |
| 2,882,263 | 4/1959 | Natta et al. | 260—93.7 |
| 2,950,267 | 8/1960 | Thompson et al. | 260—897 |
| 2,956,042 | 10/1960 | Underwood et al. | 260—897 |
| 2,993,028 | 7/1961 | Ranalli | 260—897 |
| 3,033,835 | 5/1962 | Adamek et al. | 260—79.5 |
| 3,036,987 | 5/1962 | Ranalli | 260—897 |

FOREIGN PATENTS

| | | |
|---|---|---|
| 563,470 | 6/1958 | Belgium. |
| 1,240,852 | 8/1960 | France. |

MURRAY TILLMAN, *Primary Examiner*.

DAN ARNOLD, LEON J. BERCOVITZ, DONALD E. CZAJA, *Examiners*.